Feb. 7, 1933.  A. W. ANTHONY, JR  1,896,339
ATOMIZING HEAD
Filed June 6, 1930
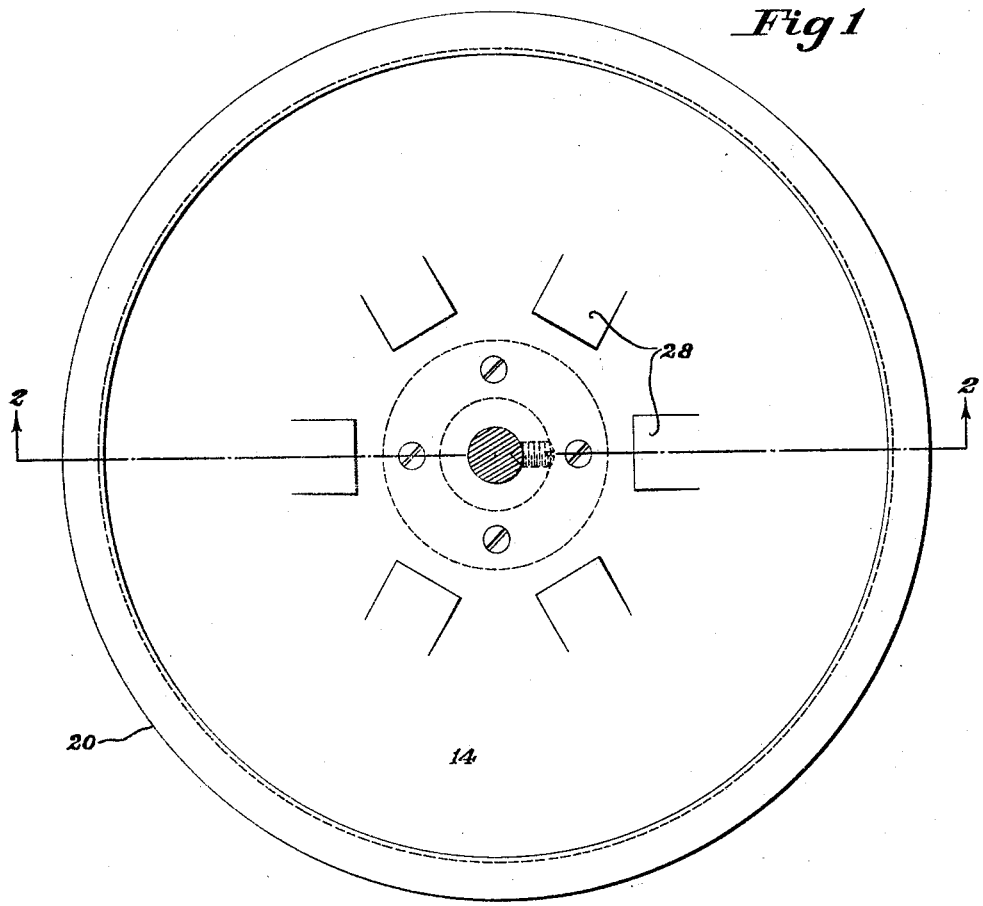
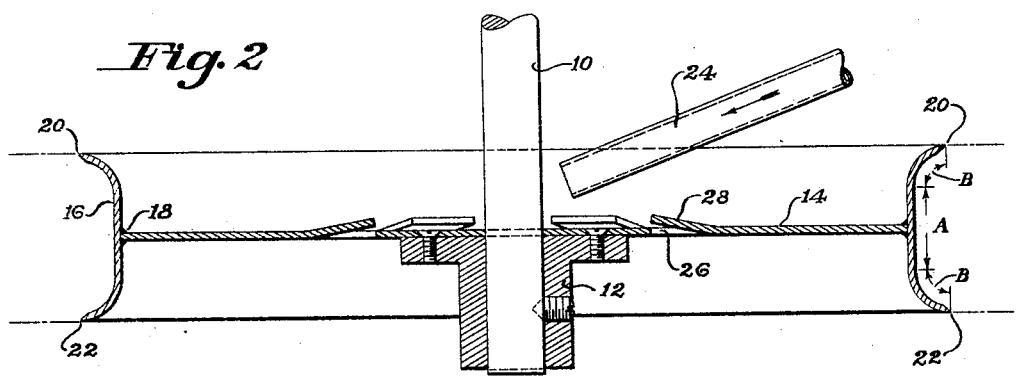
Witness
Paul F. Bryant
Inventor Patented Feb. 7, 1933

1,896,339

UNITED STATES PATENT OFFICE

ALFRED W. ANTHONY, JR., OF BELMONT, MASSACHUSETTS, ASSIGNOR TO PEASE, ANTHONY EQUIPMENT CO., OF CAMBRIDGE, MASSACHUSETTS, A CORPORATION OF MASSACHUSETTS

ATOMIZING HEAD

Application filed June 6, 1930. Serial No. 459,469.

The present invention relates to devices for obtaining a finely-divided spray of water or a similar liquid, and is more particularly employed for the purpose of humidification, air washing and scrubbing, or in fact any similar or equivalent purpose where the production of a finely atomized sheet or film of water is desired.

Attempts have been made heretofore to centrifugally spray water from a rotary head, and in some cases have been reasonably effective for limited purposes. However, all of these devices are defective when it is attempted to secure the delivery of a comparatively large volume of water in the form of a finely-divided spray, such attempts resulting merely in the delivery of a coarse spray of large droplets when the capacity is increased, with a corresponding diminution of efficiency from the standpoint of its intended purpose.

The purpose of the present invention, therefore, is the production of apparatus which will enable delivery of a relatively large capacity of water in an exceedingly fine state of sub-division.

With these and other purposes in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention,

Fig. 1 represents a plan view of my improved rotary spray member; and

Fig. 2 is a section in elevation on the line 2—2 of Fig. 1.

This rotary spray head, as shown in the illustrated embodiment of the invention, is mounted upon an operating shaft 10 which may be rotated in any desired manner as by direct connection with an electric motor. Connected to the shaft through a hub 12 is a disk of sheet material 14, designed to rotate in a substantially horizontal plane. This disk is circular, and has extending about its outer periphery a flange 16 secured to the disk in any suitable manner, as by welding, indicated at 18, and extending above and below the plane of the disk substantially equidistant, as indicated in Fig. 2. The peripheral flange is provided with a portion A substantially parallel to the axis of rotation, this portion merging into upper and lower curved portions B which terminate in upper and lower delivery edges 20 and 22, the surface of the flange immediately behind the delivery edge in each case being substantially horizontal and terminating in a relatively sharp edge from which the sheet of spray is delivered. Water may be delivered upon the central portion of the disk in any convenient manner, as by a delivery pipe 24, and thence works outwardly through centrifugal force. Distribution at opposite sides of the disk is obtained by openings 26 conveniently produced through offset tongues 28 struck out of the disk. In actual practice the peripheral velocity of the spray head may approximate 6500 to 9000 feet per minute. Due to this peripheral velocity and the centrifugal force engendered thereby, water working outwardly across the face of the disk 14 is built up in a uniform film behind the surface A above and below the disk. This film then works outwardly with gradually increasing velocity through the curved portion of the surface B, and is finally delivered from the rotating edge at high speed and in an extremely fine state of sub-division. Furthermore, due to the equidistant spacing of the periphery throughout from the axis of rotation, the film and the volume delivered from the edge are substantially uniform throughout the entire peripheral edge. The gradual conversion of the pressure head at the surface A into a velocity head as delivered from the edges 20 and 22 permits the handling of relatively large capacities with a desirable fineness of spray, and substantially precludes the formation of coarse drops, either in whole or in part, as is common with other spraying devices for an equivalent purpose. Due to the extremely fine sub-division of spray, it is incapable of maintaining its velocity throughout a substantial distance unless aided by the directional effect of the air or gas with which it contacts. Whether the directional effect and velocity of the spray are to be promoted or otherwise will depend on the use for which the spray head is intended and the manner of conducting the air or gas thereby.

What is claimed is:

1. A rotary spray head comprising a shaft, a circular rim concentric with the axis of the shaft and comprising a filming surface parallel to the axis of the shaft for building up a uniform film, merging at opposite ends through curved surfaces in sharp delivery edges tending to produce outwardly radiating films of liquid in planes normal to the axis of the shaft, and means for delivering the liquid to be sprayed approximately centrally of the filming surface.

2. A rotary spray head comprising a shaft, a circular rim concentric with the axis of the shaft and comprising a filming surface parallel to the axis of the shaft for building up a uniform film, merging at opposite ends through curved surfaces in delivery edges tending to produce outwardly radiating films of liquid in planes normal to the axis of the shaft, and a liquid delivery disk connected to the circular rim approximately centrally between the delivery edges.

3. A rotary spray head comprising a shaft, a circular rim concentric with the axis of the shaft and comprising a filming surface parallel to the axis of the shaft for building up a uniform film, merging at opposite ends through curved surfaces in delivery edges tending to produce outwardly radiating films of liquid in planes normal to the axis of the shaft, and a liquid delivery disk having openings formed therein connected to the circular rim approximately centrally between the delivery edges.

ALFRED W. ANTHONY, Jr.